Figure 1:
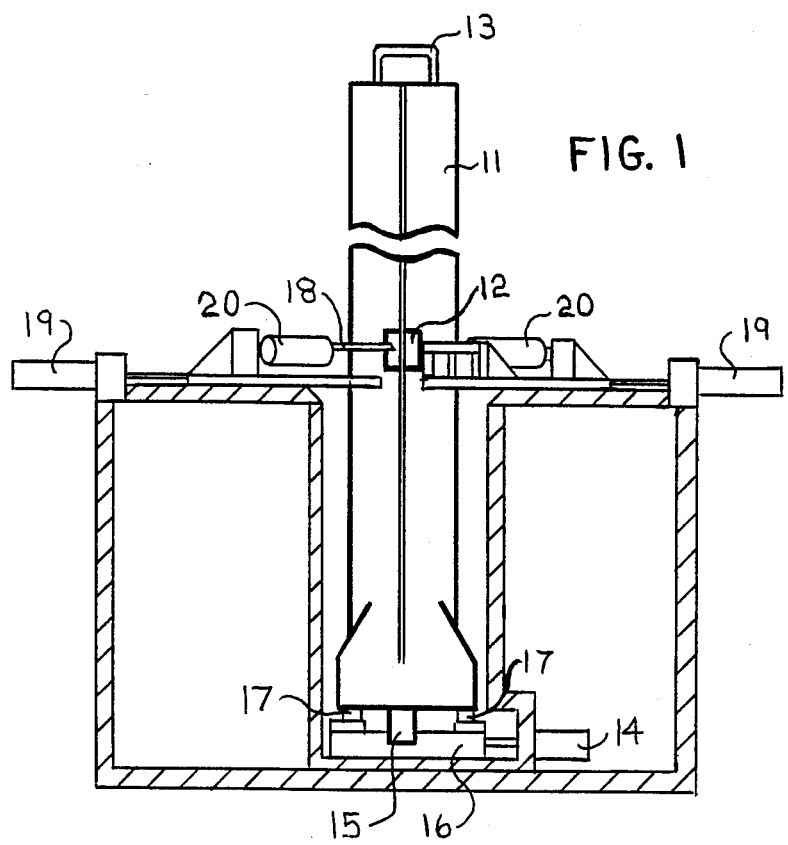

United States Patent [19]

Bednarik et al.

[11] Patent Number: 4,747,995
[45] Date of Patent: May 31, 1988

[54] VELOCITY LIMITER SHEAR FOR BWR CONTROL RODS

[75] Inventors: Alan Bednarik, Trumbull; Bonnie Whalen, Naugatuck, both of Conn.

[73] Assignee: Widder Corporation, Naugatuck, Conn.

[21] Appl. No.: 943,824

[22] Filed: Dec. 29, 1986

Related U.S. Application Data

[63] Continuation of Ser. No. 742,980, Jun. 10, 1985, abandoned.

[51] Int. Cl.$^4$ .............................................. G21C 19/00
[52] U.S. Cl. ..................................... 376/260; 225/97; 241/283; 29/723; 83/596
[58] Field of Search ................... 376/260, 272, 261; 252/626, 627; 30/210; 83/639, 596, 697, 560, 563; 225/97, 103, 6; 241/262, 283; 29/723, 400 N, 726, 426.1, 426.4

[56] References Cited

U.S. PATENT DOCUMENTS

| | | | |
|---|---|---|---|
| 3,807,018 | 4/1974 | Ehrman et al. ..................... | 29/723 |
| 4,353,391 | 10/1982 | Belmonte et al. ................... | 376/272 |
| 4,374,024 | 2/1983 | Peloquin et al. .................... | 252/626 |
| 4,434,092 | 2/1984 | Mary .................................... | 252/626 |
| 4,507,840 | 4/1985 | Steinert et al. ..................... | 376/272 |
| 4,511,499 | 4/1985 | Meuschke et al. .................. | 252/626 |
| 4,528,879 | 7/1985 | Eisenacher .......................... | 83/278 |
| 4,537,711 | 8/1985 | Wilhelm et al. ..................... | 252/626 |
| 4,547,117 | 10/1985 | Shields et al. ....................... | 376/272 |
| 4,566,361 | 1/1986 | Dubost et al. ....................... | 83/454 |
| 4,648,989 | 3/1987 | Klein .................................... | 376/261 |
| 4,650,606 | 3/1987 | Yamamoto ........................... | 376/261 |

FOREIGN PATENT DOCUMENTS

| | | |
|---|---|---|
| 0125470 | 11/1984 | European Pat. Off. . |
| 2419794 | 11/1979 | France . |
| 0202896 | 11/1983 | Japan . |
| 0099400 | 6/1984 | Japan . |
| 0180399 | 10/1984 | Japan . |

*Primary Examiner*—Deborah L. Kyle
*Assistant Examiner*—Daniel Wasil
*Attorney, Agent, or Firm*—Cobrin & Godsberg, P.C.

[57] ABSTRACT

An apparatus for the simultaneous shearing of two sides of the boiling water nuclear reactor control rod. The rotation of the rods at 90 degree rotation and the shearing of the second two sides underwater in a nuclear waste storage pool.

In a previous application by A. H. Krieg, Ser. No. 692,849, we have seen the crushing of a BWR control rod for the purpose of reducing nuclear radioactive waste. The control rod however has an end referred to as the velocity limiter end, which is round and bulbous. This end can not be crushed practically, due to its mass. The purpose of this invention is to shear or cut-off the velocity limiter from the rest of the control rod thus having the remaining cruciform crushable. Between the velocity limiter and the rest of the control rod are 2 "D" shaped holes, hereafter refered to as the "D" holes. At this point the control rod is solid and does not contain hollow fins or boron rods.

The control rod can therefore be sheared at the "D" hole without concern of polluting the containment pool. At the bottom of the velocity limiter, in its center, is a protrusion which is cylindrical. This protrusion is allowed to stick into a hole in the turntable that rotates the velocity limiter in 90 degree increments for shearing and alignment. At the bottom of the velocity limiter are four ball or wheel like protrusions. These fit into slots in the turntable, and because they are in alignment with the fins, cause the correct positioning of the entire device for shearing. They act as the positioning stop for a rotating device that controls the turning of the control rod. In this manner, it is possible to index the control rod in such a way so that the shearing heads can be activated and carry out their designed function. After the first shearing operation is complete the shearing heads are retracted from the control rod to a sufficient distance to allow rotation. After completion of rotation, the shearing heads are returned to their working position.

4 Claims, 2 Drawing Sheets

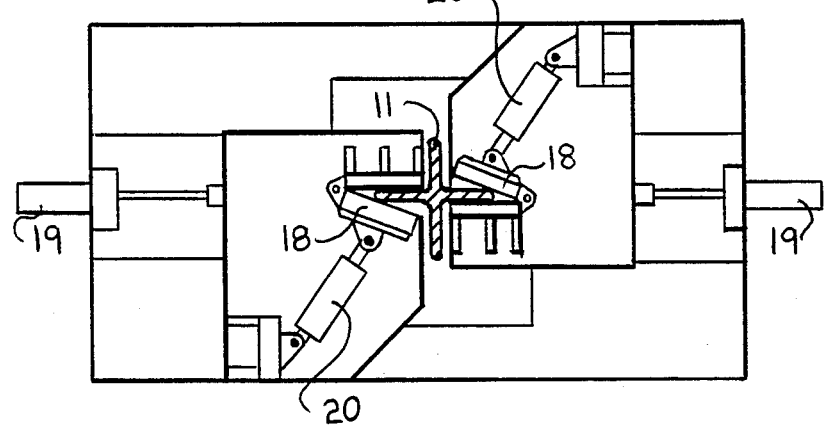

VELOCITY LIMITER SHEAR FOR BWR CONTROL RODS

This application is a continuation of application Ser. No. 742,980, filed June 10, 1985, now abandoned.

BACKGROUND OF THE INVENTION

In previous art the previous application, Ser. No. 692,849 to A. H. Krieg, filed Mar. 11, 1985, a control rod crushing device was introduced. This device was developed in order to reduce the volume of spent radioactive BWR control rods. In the process of development, it was determined that the velocity limiter end of the control rod was too substantial to crush and a method had to be developed to remove this portion of the control rod without polluting the containment pool. For this reason we developed the velocity limiter shear for BWR control rods.

SUMMARY OF THE INVENTION

The object of this invention is to provide a machine that can operate underwater in hazardous environment via remote control, shear off the velocity limiter from the BWR control rod and carry out this function without the release of any of the materials contained in the fins of the control rod. Furthermore, the invention is foreseen with a method for positioning and aligning the control rod in a simple and practical manner. This second portion of the invention is called an alignment system. A third function of the invention is that 2 fins of the control rod are sheared simultaneously so that side pressure or the inherent intrinsic slippage, is met with a counter action to a one sided shearing function, and is by equal pressure from both sides contained. Yet another function of this invention is the rotation of the control rod so as to allow the second set of fins to be sheared.

Referring now to the drawings in which like numeral refer to like parts:

In FIG. 1, we see a side view representative of the apparatus where #13 is the handle attached to #11 control rod with #12 "D" shaped holes located near the bottom end of the #11 control rod where the #15 cylindrical protrusion and #17 wheel like protrusions are. The #18 shearing heads are fed into cutting position by #19 retraction and feeding cylinders and are activated by #20 shear activating cylinders. After the first shearing operation is completed, the #18 shearing heads are retracted and the #14 rotary table cylinder turns the #16 rotary table which rotates the #11 control rod 90° for the next shearing operation.

In FIG. 2, we see a top view representative of the apparatus where the #11 control rod is positioned in the shearing apparatus and #18 shearing heads are being activated by #20 shear activating cylinders. The #19 retraction and feeding cylinders hold the #18 shearing heads in place while the shearing function is performed.

A further function is the ability to retract the shearing heads from their forward cutting and working position, so as to allow the control rod to be rotated.

A BRIEF DESCRIPTION OF THE DRAWINGS

FIG. 1: A cutaway schematic side view of the invention,

FIG. 2: A schematic top view of the invention.

MODE OF OPERATION

For the shearing of the BWR Control Rod and more exactly for the removal of the velocity limiter end, the entire control rod is held by a crane or similar apparatus at the handle #13. The assembly is then lowered into the shearing apparatus until it sits on the turntable #16. It is rotated by the handle by the operator until the #17 wheel like protrusions fall into the slots provided for them in the rotary device. It should be noted that the rotating device is not a necessity for operation of the system, as the control rod could be repositioned manually, however because this work takes place at the bottom of a fuel storage pool at least 30 ft. in depth in water, it is envisioned as being a more practical way to position for the second cut.

Once the control rod is in position, the shearing heads (#18, #19 and #20) are advanced forward in position to shear the fins. FIG. 1 and FIG. 2 represent these #19 cylinders as being in horizontal position. They can however also be mounted vertically and work via a fulcrum to save space. The cylinders #19 are foreseen with holding valves which maintain the the pressure and prevent the shear heads from retracting while under reverse pressure. The shear blades are then activated. The fins are sheared when shear heads are retracted and the #14 cylinder is activated rotating the control rod by 90° and the procedure is repeated.

What is claimed:

1. With a cruciform shaped radioactive control rod of the type having four substantially equidistantly spaced plate-like sheaths extending from and along a large portion thereof so as to provide a first set of opposed sheaths and a second set of opposed sheaths, each sheath containing at least one radioactive rod, and a velocity limiter at one end thereof, apparatus for separating said velocity limiter from the remainder of said control rod, said apparatus comprising:

shearing means for simultaneously shearing each set of two opposed sheaths adjacent the velocity limiter, said shearing means including a first shearing head operative from a first direction to shear one of the sheaths of a respective set and a second shearing head operative from a second direction substantially opposite to said first direction to shear the other of the sheaths of the respective set;

rotating means for providing relative rotation of the sheaths with respect to said shearing means such that said shearing means can simultaneously shear the other set of two opposed sheaths, to thereby separate the velocity limiter from the remainder of the control rod.

2. Apparatus according to claim 1; wherein said rotating means includes rotatable turntable means for supporting the control rod thereon in a vertical arrangement with the velocity limiter resting thereon, and control means for controlling rotation of said rotatable turntable means.

3. Apparatus according to claim 2; further including aligning means associated with said rotatable turntable means for selectively aligning each set of opposed sheaths with said first and second shearing heads.

4. Apparatus according to claim 1; wherein the control rod includes at least one hole at a position adjacent the velocity limiter and at a position at which there are no radioactive rods, and said shearing means is positioned in line the said at least one hole to shear the sheaths thereat.

* * * * *